United States Patent
Patnurkar

(10) Patent No.: US 11,486,294 B2
(45) Date of Patent: Nov. 1, 2022

(54) CONTROL SYSTEM AND METHOD FOR A FAN

(71) Applicant: Transportation IP Holdings, LLC, Norwalk, CT (US)

(72) Inventor: Narendrasingh Patnurkar, Bengaluru (IN)

(*) Notice: Subject to any disclaimer, the term of this patent is extended or adjusted under 35 U.S.C. 154(b) by 0 days.

(21) Appl. No.: 17/411,370

(22) Filed: Aug. 25, 2021

(65) Prior Publication Data

US 2022/0074338 A1 Mar. 10, 2022

Related U.S. Application Data

(60) Provisional application No. 63/074,626, filed on Sep. 4, 2020.

(51) Int. Cl.
| | |
|---|---|
| *F01P 7/04* | (2006.01) |
| *F01P 11/20* | (2006.01) |
| *B60K 11/08* | (2006.01) |
| *F01P 5/04* | (2006.01) |
| *B61C 5/00* | (2006.01) |

(52) U.S. Cl.
CPC .............. *F01P 7/048* (2013.01); *B61C 5/00* (2013.01); *F01P 5/043* (2013.01); *F01P 11/20* (2013.01); *F01P 2005/046* (2013.01); *F01P 2025/13* (2013.01); *F01P 2025/46* (2013.01); *F01P 2025/50* (2013.01)

(58) Field of Classification Search
CPC . F01D 25/02; F01D 25/12; F01P 11/20; F01P 11/10
See application file for complete search history.

(56) References Cited

U.S. PATENT DOCUMENTS

| | | | | |
|---|---|---|---|---|
| 5,873,256 | A * | 2/1999 | Denniston | .......... B60H 1/00414 62/271 |
| 6,390,217 | B1 * | 5/2002 | O'Brien | .................. B60K 11/04 160/DIG. 1 |
| 8,910,705 | B2 * | 12/2014 | Miura | ................... F25B 47/006 165/122 |
| 9,391,543 | B2 | 7/2016 | Nikolov et al. | |
| 2006/0124081 | A1 | 6/2006 | Hannesen et al. | |
| 2014/0244051 | A1 * | 8/2014 | Rollins | .................. G05D 27/02 700/282 |
| 2015/0042248 | A1 | 2/2015 | Nikolov et al. | |

(Continued)

FOREIGN PATENT DOCUMENTS

JP 0596939 A 4/1993

OTHER PUBLICATIONS

English translation of Search Report for related Eurasian Patent Application No. 202192119 dated Feb. 11, 2022 (2 pages).

(Continued)

*Primary Examiner* — Long T Tran
(74) *Attorney, Agent, or Firm* — The Small Patent Law Group LLC; Josef L. Hoffmann

(57) ABSTRACT

A system that may include an engine, and a fan configured to vary a measured engine temperature of the engine during operation. A vehicle controller may also be provided having one or more processors that may be configured to determine an ice risk characteristic of the engine, operate the fan to cool the engine based on the ice risk characteristic, and operate the fan to rotate in reverse based on the ice risk characteristic.

20 Claims, 2 Drawing Sheets

(56) References Cited

U.S. PATENT DOCUMENTS

| | | |
|---|---|---|
| 2015/0330287 A1 | 11/2015 | Dickerson |
| 2016/0069624 A1* | 3/2016 | Rollins .................. F04D 29/58 |
| | | 417/423.12 |
| 2018/0058463 A1* | 3/2018 | Rollins ................ F04D 29/059 |
| 2018/0111444 A1* | 4/2018 | Kim ................... B60H 1/00464 |
| 2018/0118015 A1* | 5/2018 | Solazzo ................ B60K 11/04 |
| 2019/0128285 A1* | 5/2019 | Soto Infante ....... F04D 29/5853 |
| 2019/0225077 A1* | 7/2019 | Brinkmann ............... F01P 7/12 |
| 2019/0226386 A1* | 7/2019 | Jolk .................... B60K 11/085 |

OTHER PUBLICATIONS

Search Report for related Eurasian Patent Application No. 202192119 dated Feb. 11, 2022 (3 pages).

\* cited by examiner

CONTROL SYSTEM AND METHOD FOR A FAN

CROSS-REFERENCE TO RELATED APPLICATIONS

This application claims priority to U.S. Provisional Application No. 63/074,626 entitled Control System and Method for a Fan filed Sep. 4, 2020, hereby incorporated by reference in its entirety.

BACKGROUND

Technical Field

The subject matter described relates to a system and method for operating and/or controlling fan.

Discussion of Art

Some engines may include a cooling system so that the engine operates efficiently. The cooling system may include a cooling fan used to convey heat away from the engine, a circuit of an inverter used to power the engine, or like components.

When a vehicle travels through regions where the ambient temperature is below freezing use of a fan may be reduced as a result of the natural cooling of the ambient air. Unfortunately, during times of non-use moisture in the air can form ice on the fan. Similarly, when snow or ice storms occur, ice may form on the blades of a cooling fan. Ice formed on the fan may result in additional loading and power required to rotate the fan. In some instances, the ice may fill a gap between a fan blade and a housing obstructing and/or preventing rotation of the fan. As a result, the current to the fan to rotate the fan may spike as the fan motor attempts to rotate the fan and break the ice.

The overloading and current spikes resulting from ice on the fan can cause wear and reduced life of the fan. In some instances, failure of the fan can occur. Fan failure may result in improper cooling and damage to other components. Thus, the formation of ice on the fan may increase maintenance time, component wear, and expense. It may be desirable to have a different system and method than those that are currently available.

BRIEF DESCRIPTION

In one or more embodiments, a system is provided that may include a controller having one or more processors that may determine a temperature characteristic and operate the fan to cool a component based at least in part on the temperature characteristic, and may operate the fan to rotate in reverse based on the temperature characteristic.

In one or more embodiments, a control system is provided that may include one or more processors that determine an ice risk characteristic of an engine, operate a fan to cool the engine based on the ice risk characteristic, and operate the fan to rotate in reverse based on the ice risk characteristic when a measured engine temperature is below a determined first engine threshold temperature.

In one or more embodiments, a method is provided that may include determining an ice risk characteristic of an engine, operating a fan to cool the engine based on the ice risk characteristic, and operating the fan to rotate in reverse based on the ice risk characteristic.

BRIEF DESCRIPTION OF THE DRAWINGS

The subject matter may be understood from reading the following description of non-limiting embodiments, with reference to the attached drawings, wherein below.

DETAILED DESCRIPTION

Embodiments of the subject matter described herein relate to a system and method for controlling and/or operating a fan. In one embodiment, a controller monitors a temperature and/or a humidity level. In one embodiment, the component is an engine. A measured engine temperature is obtained, and when the engine is below a determined first engine threshold temperature and a fan is not in use to cool the engine, and a temperature and/or humidity reading indicates that ice could be forming on the blades of the fan. At this time, the vehicle controller may cause rotation of the fan in reverse. This may be done at relatively at low speeds. By rotating the fan, moisture cannot rest on the fan blade. This may reduce or prevent the formation of ice on the blade. By rotating the fan in reverse, and by closing a shutter between the fan and engine, inadvertent and undesired cooling of the engine may be reduced or prevented.

As the measured engine temperature increases and approaches a temperature when the fan may be used to cool the engine, a first engine threshold temperature is exceeded, and the vehicle controller commands to no longer operate the fan in reverse. The shutter may also be opened at this time. Upon the engine reaching a second engine threshold temperature, the fan rotates in forward to cool the engine. By stopping the rotation of the fan in reverse before the fan is to operate in a forward direction, a current spike that would be caused as a result of switching fan operating direction from reverse to forward may be avoided. Thus, by operating the fan in a low reverse speed, the fan reduces ice formation on the blades of the fan, reducing fan load, increasing fan life, and reducing fan and engine maintenance and costs.

Figure 1:
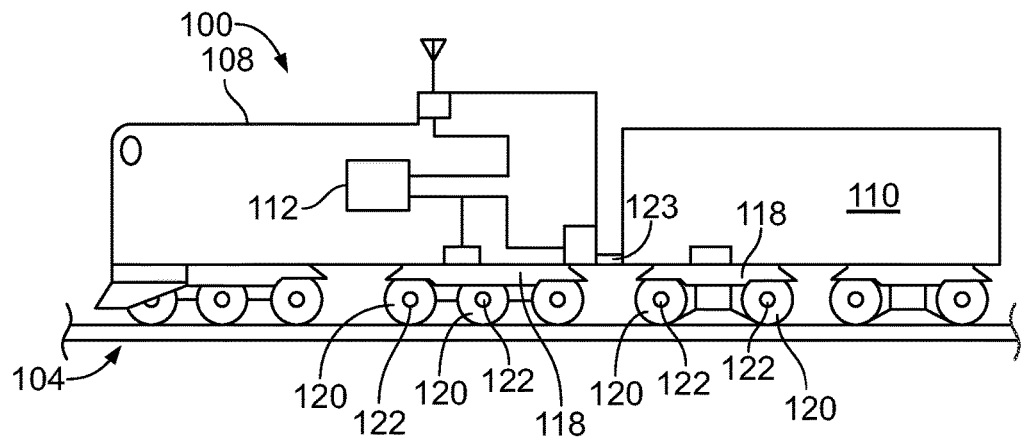
FIG. 1 illustrates a schematic diagram of a vehicle system according to an embodiment of the invention.

FIG. 1 illustrates a schematic diagram of a vehicle system 100. The vehicle system may travel along a route 104 on a trip from a starting or departure location to a destination or arrival location. The vehicle system may include a propulsion-generating vehicle 108 and a non-propulsion-generating vehicle 110 that are mechanically interconnected to one another to travel together along the route. The vehicle system may include at least one propulsion-generating vehicle and optionally, one or more non-propulsion-generating vehicles. In one example, the single vehicle may be a hybrid truck. As a hybrid truck, it may have a multi-fuel capable engine.

The propulsion-generating vehicle may generate tractive efforts to propel (for example, pull or push) the non-propulsion-generating vehicle along the route. The propulsion-generating vehicle may include a propulsion subsystem, including one or more traction motors, that generates tractive effort to propel the vehicle system.

In the illustrated embodiment, a control system 112 may be disposed entirely on the propulsion vehicle. In other embodiments, however, one or more components of the control system may be distributed among several vehicles, such as the vehicles that make up the vehicle system. For example, some components may be distributed among two or more propulsion vehicles that are coupled together in a group or consist. In an alternative embodiment, at least some of the components of the control system may be located remotely from the vehicle system, such as at a dispatch location. The remote components of the control system may communicate with the vehicle system (and with components of the control system disposed thereon).

In the illustrated embodiment, the vehicle system is a rail vehicle system and the route is a track that is formed by one or more rails. The propulsion vehicle is a locomotive, and the car is a rail car that carries passengers and/or cargo. In other embodiments, the propulsion vehicle may be another type of rail vehicle other than a locomotive. In other embodiments, other suitable vehicle systems may include automobiles, marine vessels, aircraft, mining vehicles, agricultural vehicles, or other off-highway vehicles (OHV) systems (e.g., a vehicle system that is not permitted and/or designed for travel on public roadways), or the like. While some examples provided herein describe the route as being a track, not all embodiments are limited to a rail vehicle traveling on a railroad track. One or more embodiments may be used in connection with non-rail vehicles and routes other than tracks, such as roads, paths, waterways, or the like.

In the example of FIG. 1, the vehicles of the vehicle system each include multiple wheels 120 that engage the route and at least one axle 122 that couples left and right wheels together (only the left wheels are shown in FIG. 1). Optionally, the wheels and axles are located on one or more trucks or bogies 118. Optionally, the trucks may be fixed-axle trucks, such that the wheels are rotationally fixed to the axles, so the left wheel rotates the same speed, amount, and at the same times as the right wheel. The vehicles in a vehicle system may be mechanically coupled with each other, such as by couplers. For example, the propulsion vehicle can be mechanically coupled to the car by a coupler 123. Alternatively, the vehicles in a vehicle system may not be mechanically coupled with each other but may be logically or virtually coupled with each other. For example, the vehicles may be logically coupled with each other by the vehicles communicating with each other to coordinate the movements of the vehicles with each other so that the vehicles travel together in a convoy or group as the vehicle system.

Figure 2:
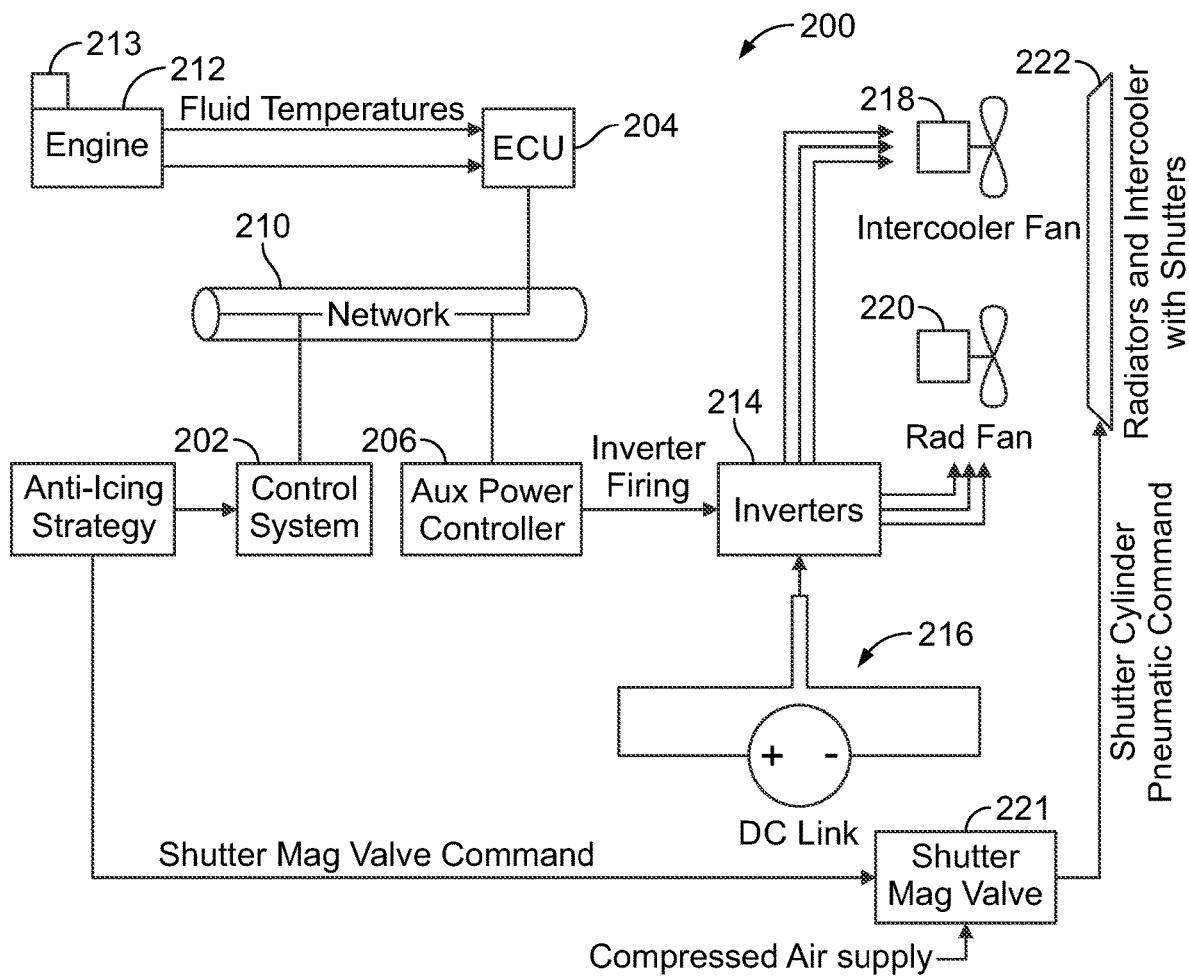
FIG. 2 illustrates a schematic diagram of a control system according to an embodiment of the invention.

FIG. 2 illustrates a control system 200 for the vehicle system of FIG. 1. The control system may include a vehicle controller 202 that may be in communication with an engine controller 204 such as an engine control unit (ECU), an auxiliary controller 206. The vehicle controller may be in communication with the engine controller and auxiliary controller directly, or through a network 210 such as in one example, an ethernet network, cellular network, over the air communication, or the like.

The engine controller may be electrically coupled to an engine 212 to provide input signals and receive output signals from the engine. For example, the engine may include temperature sensors 213 that detect a measured engine temperature. The engine may also include sensors that determine the temperature of working fluids within the engine or a circuit board within the engine. Suitable engines may be an internal combustion engine, hybrid engine, electrical or battery powered engine, etc. In one example, the engine may be a stationary engine that is not utilized in association with a vehicle. In an example embodiment when the engine is stationary, the engine may be controlled using a stationary controller.

In each example, the temperature sensors may provide an ice risk characteristic. Such characteristic may include a measured engine temperature, a temperature reading itself, a current level from which temperature may be determined, air temperature surrounding the engine, or the like. Based on the ice risk characteristic, either the engine controller, vehicle controller, etc. may have or more processors that determine the measured engine temperature based on the ice risk characteristic. The determination may be made using a look-up table, an algorithm, a mathematical equation, or the like.

The auxiliary power controller in one example may be a fan controller that may be operably coupled to an input device 214 such as one or more inverters. In one example the input device may be electrically coupled to a direct current (dc) power source 216, or dc link. The input device may provide input for a first fan 218 and a second fan 220. In one example, the first fan may be an intercooler fan that may be actuated to cool the engine or a component of the engine. Meanwhile, the second fan may be a radiator fan that may be used to convey heat from the engine. In particular, the first fan and second fan may operate as a heat exchanging system with the intercooling fan providing cooling air, while the radiator fan receives heated air.

In one example, each of the first and the second fans are variable speed fans where the fans may vary in speed. Alternatively, a non-variable speed fan may be provided where the fan may have plural settings with each setting being a specific speed, wherein the fan may not be held at a speed between the plural settings. In an embodiment, each of the first fan and second fan may be selectively operated in both a forward and reverse direction. Each fan may operate in reverse. Each fan may operate at a relatively low speed. In one example each fan may rotate at a speed, in reverse, that is in a range of from about twenty-five revolutions per minute (25 rpm) to about fifty revolutions per minute (50 rpm). In one example each fan may rotate at a speed, in reverse, that is in a range of from about fifty revolutions per minute (50 rpm) to about seventy-five revolutions per minute (75 rpm). In another example each fan may rotate at a speed that is less than the normal full forward capacity for fan rotation. In one embodiment, the controller can operate the fan in pulses to shake water from the fan. In one embodiment, the controller can operate the fan at a speed that is sufficient to shed water from the fan.

The vehicle controller may be operably coupled to a valve 221 that is itself coupled to a shutter 222. The valve may be actuated for opening and closing the shutter. The shutter may be disposed between the fans and the engine, or component of the engine to be cooled. In particular, the shutters may function to reduce or prevent air flowing from the fans to the engine, such that if a fan is operating at a time when the engine or component of the engine does not need to be cooled, the shutter blocks and resists the flow of air from the fans to the engine or component of the engine. Thus, the valve may operate to open and close the shutter depending on the measured engine temperature.

In operation, the vehicle controller receives an anti-icing strategy. The vehicle controller also receives inputs from the engine controller related to an ice risk characteristic. The ice risk characteristic may include the measured engine temperature, the temperature of fluids of the engine, the ambient temperature of the vehicle, the temperature of a circuit board or components on a circuit board, or the like. Then, based on the ice risk characteristic, one or more of the fans are commanded to operate accordingly.

For example, if the ambient temperature is below freezing, and the engine is below a determined first engine threshold temperature, a fan may be commanded to operate in a reverse direction at a low rotational speed. By providing this movement, ice is less likely to form on the blades of the fan preventing an ice buildup that would cause additional stresses on the fan to operate. When the measured engine temperature increases to above the determined first engine threshold temperature, this is an indication the cooling of the engine will be needed soon. Thus, when the first engine threshold temperature is exceeded, the vehicle controller may command the fan controller to cease operation of the fan in operation. Then, when a determined second engine threshold temperature is reached, cooling is required. Thus, the vehicle controller may command the valve to open the shutter, and the fan controller to rotate a fan in the forward direction to begin cooling the engine.

Figure 3:
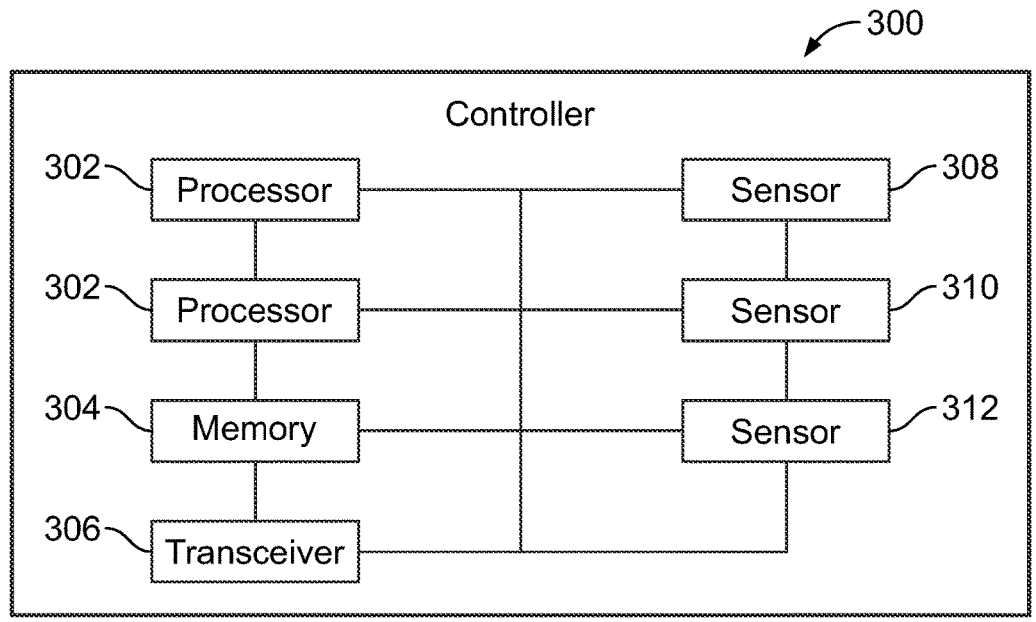
FIG. 3 illustrates a schematic diagram of a controller according to an embodiment of the invention.

FIG. 3 illustrates an example controller 300 that may be used within a vehicle system. In one example the vehicle system is the vehicle system of FIG. 1. In another example, the controller may be the same as or may differ from the controllers described in relation to FIG. 2, including the vehicle controller, engine controller, auxiliary controller, etc.

The controller may have one or more processors 302, a storage unit (such as a memory 304), and a transceiver 306 that may be used to send and receive communication signals. In one example, the transceiver may receive communication signals from an engine controller, auxiliary controller, remote controllers, sensors, or the like. The controller may include plural sensors 308, 310, and 312. While three sensors are illustrated, in some examples the controller may not include any sensors and may only use information communicated from another controller or stored within the storage device. In other embodiments, more than three sensors may be provided. Each sensor may be used to monitor and receive information. The information may relate to an ice risk characteristic, an environmental temperature, and/or a humidity level. Humidity sensors may provide information regarding precipitation. To this end, a sensor may monitor the ambient temperature around a vehicle, an ambient temperature around an engine, the temperature of fluid within the engine, the temperature of a circuit board or circuit board component of the engine, current used to rotate the fan, and the like. In other examples, a sensor may be used to determine the speed of rotation of a fan, the direction of rotation of a fan, a position of a shutter, etc. In one embodiment, information about ambient temperature, ambient humidity proximate to the fan, and precipitation levels may be provided remotely (from offboard the vehicle).

The controller may not only monitor or receive ice risk characteristics, the controller may also analyze signals to determine the measured engine temperature, or vehicle accordingly. The controller may make determinations through use of a look-up table, an algorithm, mathematical process or calculation, modeling, or the like. By making the temperature determinations, the controller may operate the fan to reduce and prevent the formation of ice on the fan while not causing spikes in current as a result of attempting to rotate a fan that is rotating in a reverse direction, in a forward direction.

Figure 4:
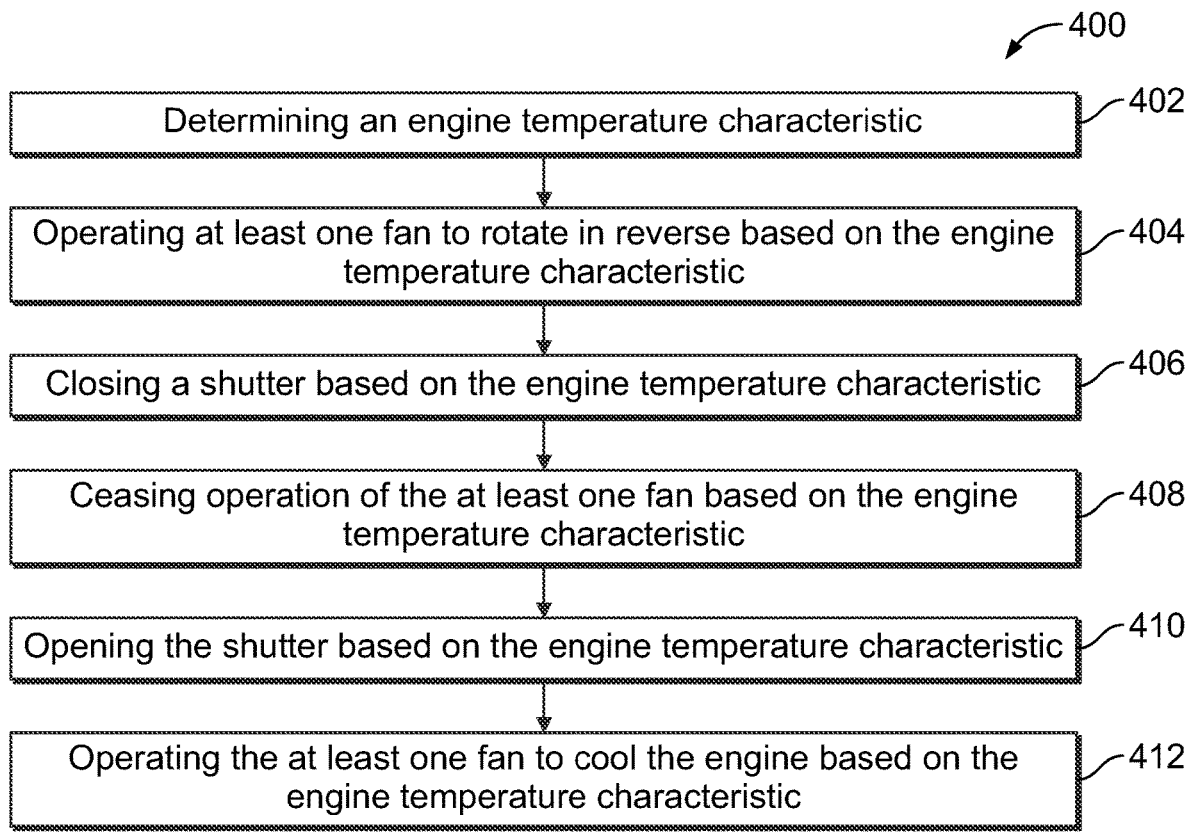
FIG. 4 illustrates a schematic block diagram of a method according to an embodiment of the invention.

FIG. 4 illustrates a method 400 for reducing ice on a fan. In one example, the vehicle, engine, control system, controller, sensors, etc. used to implement the method are described in FIGS. 1-3.

At step 402, an ice risk characteristic is determined. The ice risk characteristic may be a measured engine temperature, an ambient temperature, a predicted average ambient temperature for a trip, an engine fluid temperature, circuit board temperature, a circuit board component temperature, a current of an auxiliary device, etc. The characteristic may be determined by receiving signals from sensors, from within a trip plan, from a controller, or the like and using a look-up table, algorithm, mathematical process or calculation, modeling, or the like. The ice risk characteristic in one example may be a determination of the measured engine temperature itself, or a determination of a characteristic that relates to the measured engine temperature.

At step 404, a fan is operated to rotate in reverse based on the ice risk characteristic when the fan in not operating to cool the engine. In one example, the fan may be a cooling fan of the engine, whereas in another example, the fan is a radiator fan of the engine. Alternatively, the fan is both a cooling fan and a radiator fan. By rotating the fan in reverse, air that could provide undesired cooling of the engine may be mitigated by being drawn away from the engine. In an example, the fan rotates at a low speed such as less than 75 rpm. In another example, the fan rotates at a speed in a range of between 25 rpm and 75 rpm. In yet another example, the fan may be a variable speed fan, whereas in other examples, the fan is a non-variable speed fan. By rotating the fan at a low speed, the amount of condensation on the fan may be reduced or removed by the rotating movement, reducing the amount of ice that may be formed on the blades of the fan.

At step 406, a shutter is closed based on the ice risk characteristic. In one example, the shutter is closed when a measured engine temperature is below a first engine threshold temperature. Specifically, when the fan is operating to rotate in reverse, the shutter is closed to prevent air from flowing over the engine, or a component of the engine, inadvertently cooling the engine.

At step 408, the fan ceases operating in reverse based on the ice risk characteristic. As the engine operates, and the measured engine temperature increases to approach the temperature at which the cooling fan operates in forward to cool the engine, the vehicle controller sends a command signal to have the fan ceases reverse rotation. Consequently, at a determined first engine threshold temperature, the fan stops rotating in reverse, so that when a second engine threshold temperature is reached the fan may begin rotating in a forward direction.

At step 410, the shutter is opened based on the ice risk characteristic. In one example, when the determined first engine threshold temperature is reached the shutter is opened in anticipation of the fan being rotated in a forward direction for cooling. Alternatively, when the second engine threshold temperature is reached the shutter is opened as the fan begins to rotate in the forward direction. In yet another example, the shutter is opened at a time between the determined first engine threshold temperature and second engine threshold temperature. By opening at a time in between the first engine threshold temperature and second engine threshold temperature, time may be provided for the fan to stop rotating in reverse and cooling the engine prematurely, yet ensure the shutter is open when the fan begins rotating in a forward direction.

At step 412, the fan operates to cool the engine based on the ice risk characteristic. In one example, the fan operates when the second engine threshold temperature is reached. Thus, the fan operates almost continually when the potential for ice formation is provided. The term 'almost continually' references to rotation of the fan in either a rearward or forward direction, except during the time when the measured engine temperature is between the first engine threshold temperature and second engine threshold temperature. Because the fan is operated to rotate almost continually, water may be removed from the fan blade and ice formation may be reduced and/or prevented. Thus, when operated in forward, ice does not result in additional load on the blades of the fan, reducing wear on the fan. This increases life of the fan, reduces maintenance on the fan, and ensures the engine may be cooled, preventing an on the road or route engine failures, and undesired downtime. In one embodiment, the fan operation is not at full capacity but rather in a slower "idle" or "free-wheeling" mode. In such a mode, the fan spins fast enough to shed water, snow and/or ice but not as fast as when it is operating to cool a component.

In one or more embodiments, a system is provided that may include a controller that may have one or more processors that may determine a component (such as an engine) temperature characteristic, operate the fan to cool the component based on the temperature characteristic, and operate the fan to rotate in reverse based on the temperature characteristic.

Optionally, the controller may determine a measured engine temperature based on the ice risk characteristic, and rotate the fan in reverse when the measured engine temperature is below a determined first engine threshold temperature, cease operation of the fan when the measured engine temperature is at or above the determined first engine threshold temperature and below a second engine threshold temperature, and rotate the fan in forward when the measured engine temperature is at or above the second engine threshold temperature. Optionally, the one or more processors of the vehicle controller may receive signals from temperature sensors coupled to a vehicle housing the engine, sensors coupled to a fluid system coupled to the engine.

Optionally, the one or more processors of the vehicle controller may determine the ice risk characteristic from a trip plan inputted into or communicated to the vehicle controller. Optionally, the one or more processors of the vehicle controller may be in communication with a fan controller that may operate the fan. Optionally, the one or more processors of the vehicle controller may be in communication with an engine controller to receive signals from the engine used to determine the ice risk characteristic of the engine. Optionally, the system may also include shutters disposed between the fan and the engine to reduce air flow from the fan over the engine. Optionally, the one or more processors of the vehicle controller may be in communication with a valve that may operate the shutters to close the shutters below a first engine threshold temperature of the engine and open the shutters above the first engine threshold temperature. Optionally, the fan may be a variable speed fan. Optionally, the fan may include a cooling fan and a radiator fan.

In one or more embodiments, a control system is provided that may include one or more processors that may determine an ice risk characteristic of an engine, operate a fan to cool the engine based on the ice risk characteristic, and operate the fan to rotate in reverse based on the ice risk characteristic when a measured engine temperature is below a determined first engine threshold temperature. Optionally, the one or more processors may determine the measured engine temperature based on the ice risk characteristic, cease operation of the fan when the measured engine temperature is at or above the determined first engine threshold temperature and below a second engine threshold temperature, and rotate the fan in forward when the measured engine temperature is at or above the second engine threshold temperature.

Optionally, the one or more processors may receive signals from temperature sensors to determine the ice risk characteristic. Optionally, the one or more processors may determine the ice risk characteristic from a trip plan inputted into or communicated to the one or more processors. Optionally, the one or more processors may close shutters located between the engine and a fan below the determined first engine threshold temperature and open the shutters above the first engine threshold temperature.

In one or more embodiments, a method may be provided that may include determining an ice risk characteristic of an engine, operating a fan to cool the engine based on the ice risk characteristic, and operating the fan to rotate in reverse based on the ice risk characteristic. Optionally, the ice risk characteristic may be an measured engine temperature, or parameter used to determine the measured engine temperature.

Optionally, the method may include receiving signals from at least one temperature sensor and/or humidity sensor to determine the ice risk characteristic. Optionally, the method may include communicating with an engine controller to receive signals from the engine used to determine the ice risk characteristic. Optionally, the method may include receiving an input at an interface or communication from a remote controller to determine the ice risk characteristic.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A system comprising:
   a controller having one or more processors configured to:
   operate a fan in forward to cool an engine in response to a measured engine temperature being hotter than a determined first engine threshold temperature;
   determine an ice risk characteristic of the engine;
   operate the fan to rotate in reverse based at least in part on the ice risk characteristic; and
   wherein the controller is configured to operate the fan in pulses sufficient to shake liquid from the fan.

2. The system of claim 1, wherein the controller is configured to:
   determine the measured engine temperature;
   initiate rotation of the fan in reverse responsive to the measured engine temperature being no hotter than the determined first engine threshold temperature;
   cease operation of the fan responsive to the measured engine temperature being at least as hot as the determined first engine threshold temperature but cooler than a determined second engine threshold temperature; and
   rotate the fan in forward when the measured engine temperature is at least as hot as the determined second engine threshold temperature.

3. The system of claim 1, wherein the controller is configured to receive a signal from a temperature sensor coupled to a vehicle housing the engine, the sensor coupled to a fluid system that is coupled to the engine.

4. The system of claim 1, wherein the controller is configured to determine the ice risk characteristic based at least in part on one or both of a trip plan or information communicated to the controller from offboard a vehicle.

5. The system of claim 1, wherein the controller is configured to operate the fan at a slower speed than a full operational speed capacity of the fan but sufficiently fast to shed the liquid from the fan.

6. The system of claim 1, further comprising shutters disposed between the fan and the engine to reduce air flow from the fan over the engine.

7. The system of claim 6, wherein the controller is configured to close the shutters responsive to the measured engine temperature being cooler than a first engine threshold temperature and to open the shutters responsive to the measured engine temperature being at least as hot as the first engine threshold temperature.

8. The system of claim 1, wherein the fan is a variable speed fan.

9. The system of claim 1, wherein the fan is one of a plurality of fans, and the plurality of fans includes a cooling fan and a radiator fan.

10. A control system comprising one or more processors configured to:
    determine an ice risk characteristic of an engine;
    operate a fan to cool the engine when a measured engine temperature is greater than a determined first engine threshold temperature;
    operate the fan to rotate in reverse to prevent formation of ice on the fan based at least in part on the ice risk characteristic when a measured engine temperature is below the determined first engine threshold temperature; and
    operate the fan in pulses sufficient to shake water from the fan.

11. The control system of claim 10, wherein the one or more processors are configured to determine the measured engine temperature, cease operation of the fan when the measured engine temperature is at or above the determined first engine threshold temperature and below a second engine threshold temperature, and rotate the fan in forward when the measured engine temperature is at or above the second engine threshold temperature.

12. The control system of claim 10, wherein the one or more processors are configured to receive signals from temperature sensors to determine the ice risk characteristic.

13. The control system of claim 10 wherein the one or more processors are configured to determine the ice risk characteristic based at least in part on one or both of a trip plan inputted into the control system or information communicated remotely to the one or more processors.

14. The control system of claim 10, wherein the one or more processors are configured to close shutters located between the engine and the fan below the first engine threshold temperature, and open the shutters above the first engine threshold temperature.

15. A method, comprising:
    determining an ice risk characteristic of an engine;
    operating a fan to cool the engine based on a measured engine temperature being greater than a determined first engine threshold temperature;
    operating the fan to rotate in reverse to prevent formation of ice on the fan based at least in part on the ice risk characteristic; and
    operating the fan in pulses sufficient to shake water from the fan.

16. The method of claim 15, wherein the ice risk characteristic is based at least in part on the measured engine temperature, a parameter used to determine the measured engine temperature, an ambient temperature adjacent to the engine, and an ambient humidity level adjacent to the engine.

17. The method of claim 15, further comprising receiving signals from at least one temperature sensor to determine the ice risk characteristic, the measured engine temperature, or both.

18. The method of claim 15, further comprising communicating with an engine controller to receive signals used to determine the ice risk characteristic.

19. The method of claim 15, further comprising receiving an input at an interface or communication from a remote source to determine the ice risk characteristic.

20. The method of claim 15, further comprising:
closing shutters located between the engine and the fan below the first engine threshold temperature, and
opening the shutters above the first engine threshold temperature.

* * * * *